United States Patent

Cammenga et al.

[11] Patent Number: 6,111,683
[45] Date of Patent: *Aug. 29, 2000

[54] ELECTROCHROMIC MIRRORS HAVING A SIGNAL LIGHT

[75] Inventors: David J. Cammenga, Zeeland; Jeffrey A. Forgette, Jenison; Scott W. Vander Zwaag, Holland, all of Mich.

[73] Assignee: Gentex Corporation, Zeeland, Mich.

[ * ] Notice: This patent is subject to a terminal disclaimer.

[21] Appl. No.: 09/175,984

[22] Filed: Oct. 20, 1998

Related U.S. Application Data

[63] Continuation-in-part of application No. 08/831,808, Apr. 2, 1997, Pat. No. 5,825,527.

[51] Int. Cl.[7] ............................................. G02F 1/153
[52] U.S. Cl. .................. 359/267; 359/839; 359/589; 362/30; 362/494; 340/468
[58] Field of Search ................................. 359/265, 267, 359/271, 604, 843, 839, 884, 589; 340/461, 468; 362/30, 494

[56] References Cited

U.S. PATENT DOCUMENTS

| | | | |
|---|---|---|---|
| 3,266,016 | 8/1966 | Maruyama et al. | 340/98 |
| 4,588,267 | 5/1986 | Pastore | 340/98 |
| 4,630,904 | 12/1986 | Pastore | 340/98 |
| 4,882,565 | 11/1989 | Gallmeyer | 340/461 |
| 5,189,537 | 2/1993 | O'Farrell | 359/71 |
| 5,207,492 | 5/1993 | Roberts | 362/30 |
| 5,253,109 | 10/1993 | O'farrell et al. | 359/604 |
| 5,285,060 | 2/1994 | Larson et al. | 250/214 AL |
| 5,355,245 | 10/1994 | Lynam | 359/267 |
| 5,361,190 | 11/1994 | Roberts et al. | 362/61 |
| 5,550,677 | 8/1996 | Schofield et al. | 359/604 |
| 5,668,663 | 9/1997 | Varaprasad et al. | 359/608 |
| 5,724,187 | 3/1998 | Varaprasad et al. | 359/608 |
| 5,788,357 | 8/1998 | Muth et al. | 359/634 |
| 5,825,527 | 10/1998 | Forgette et al. | 359/267 |
| 6,005,724 | 12/1999 | Todd | 359/884 |

FOREIGN PATENT DOCUMENTS

| | | |
|---|---|---|
| 2326489 | 12/1998 | United Kingdom . |
| 9530495 | 11/1995 | WIPO . |

*Primary Examiner*—Loha Ben
*Attorney, Agent, or Firm*—Price, Heneveld, Cooper, DeWitt & Litton; Brian Rees

[57] ABSTRACT

An improved electrochromic rearview mirror assembly for motor vehicles is disclosed that includes a signal light mounted behind the electrochromic mirror. The electrochromic mirror has a signal light area formed in its reflective coating by removing a portion of the reflective coating and aligning the signal light with this signal light area. The portion removed is laser ablated to leave lines devoid of reflective material separated by lines of the reflective material. The signal light area may be formed in the reflective coating of the electrochromic mirror regardless of whether the reflective coating is applied to the rear or front surface of the rear element of the electrochromic mirror. If the reflective coating is applied to the front surface of the rear element (i.e., the third surface), the reflective material used is also electrically conductive so as to function as one of the electrodes for the electrochromic mirror. In this case, the remaining lines of reflective material in the signal light area are in electrical contact with the remaining reflective and conductive layer on the third surface. The reflective layer forms an integral electrode in contact with the electrochromic media, and may be a single layer of a highly reflective material or may comprise a series of coatings where the outer coating is a highly reflecting material.

44 Claims, 5 Drawing Sheets

ELECTROCHROMIC MIRRORS HAVING A SIGNAL LIGHT

CROSS-REFERENCE TO RELATED APPLICATION

This application is a continuation-in-part of U.S. patent application Ser. No. 08/831,808, entitled "AN INFORMATION DISPLAY AREA ON ELECTROCHROMIC MIRRORS HAVING A THIRD SURFACE METAL REFLECTOR," filed on Apr. 2, 1997, by Jeffrey A. Forgette et al., now U.S. Pat. No. 5,825,527, the entire disclosure of which is incorporated herein by reference.

BACKGROUND OF THE INVENTION

This invention relates to electrochromic mirror assemblies and to outside rearview mirror assemblies having signal lights.

Outside rearview mirror assemblies for vehicles have recently been developed that include signal lights, such as turn signal lights, behind the rear surface of the mirror. Examples of such signal mirrors are disclosed in U.S. Pat. Nos. 5,207,492, 5,361,190, and 5,788,357. By providing a turn signal light in an outside mirror assembly a vehicle, or other vehicles travelling in the blind spot of the subject vehicle, will be more likely to notice when the driver has activated the vehicle's turn signal and thereby attempt to avoid an accident. Such mirror assemblies typically employ a dichroic mirror and a plurality of red LEDs mounted behind the mirror as the signal light source. The dichroic mirror includes a glass substrate and a dichroic reflective coating provided on the rear surface of the glass plate that transmits the red light generated by the LEDs as well as infrared radiation while reflecting all light and radiation having wavelengths less than that of red light. By utilizing a dichroic mirror, such mirror assemblies hide the LEDs when not in use to provide the general appearance of a typical rearview mirror, and allow the red light from such LEDs to pass through the dichroic mirror and be visible to drivers of vehicles behind and to the side of the vehicle in which such a mirror assembly is mounted.

In daylight the intensity of the LEDs must be relatively high to enable those in other vehicles to readily notice the signal lights. Because the image reflected toward the driver is also relatively high in daylight, the brightness of the LEDs is not overly distracting. However, at night, the same LED intensity could be very distracting, and hence, potentially hazardous To avoid this problem, a day/night sensing circuit is mounted in the signal light subassembly behind the dichroic mirror to sense whether it is daytime or nighttime and toggle the intensity of the LEDs between two different intensity levels. The sensor employed in the day/night sensing circuit is most sensitive to red and infrared light so as to more easily distinguish between daylight conditions and the bright glare from the headlights of a vehicle approaching from the rear. Hence, the sensor may be mounted behind the dichroic coating on the dichroic mirror.

The dichroic mirrors used in the above-described outside mirror assemblies suffer from the same problems of many outside mirror assemblies in that their reflectance cannot be dynamically varied to reduce nighttime glare from the headlights of other vehicles.

Heretofore, various automatic rearview mirrors for motor vehicles have been devised which automatically change from the full reflectance mode (day) to the partial reflectance mode(s) (night) for glare protection purposes from light emanating from the headlights of vehicles approaching from the rear. The electrochromic mirrors disclosed in U.S. Pat. No. 4,902,108, entitled "SINGLE-COMPARTMENT, SELF-ERASING, SOLUTION-PHASE ELECTROCHROMIC DEVICES SOLUTIONS FOR USE THEREIN, AND USES THEREOF," issued Feb. 20, 1990, to H. J. Byker; Canadian Patent No. 1,300,945, entitled "AUTOMATIC REARVIEW MIRROR SYSTEM FOR AUTOMOTIVE VEHICLES," issued May 19, 1992, to J. H. Bechtel et al.; U.S. Pat. No. 5,128,799, entitled "VARIABLE REFLECTANCE MOTOR VEHICLE MIRROR," issued Jul. 7, 1992, to H. J. Byker; U.S. Pat. No. 5,202,787, entitled "ELECTRO-OPTIC DEVICE," issued Apr. 13, 1993, to H. J. Byker et al.; U.S. Pat. No. 5,204,778, entitled "CONTROL SYSTEM FOR AUTOMATIC REARVIEW MIRRORS," issued Apr. 20, 1993, to J. H. Bechtel; U.S. Pat. No. 5,278,693, entitled "TINTED SOLUTION-PHASE ELECTROCHROMIC MIRRORS," issued Jan. 11, 1994, to D. A. Theiste et al.; U.S. Pat. No. 5,280,380, entitled "UV-STABILIZED COMPOSITIONS AND METHODS," issued Jan. 18, 1994, to H. J. Byker; U.S. Pat. No. 5,282,077, entitled "VARIABLE REFLECTANCE MIRROR," issued Jan. 25, 1994, to H. J. Byker; U.S. Pat. No. 5,294,376, entitled "BIPYRIDINIUM SALT SOLUTIONS," issued Mar. 15, 1994, to H. J. Byker; U.S. Pat. No. 5,336,448, entitled "ELECTROCHROMIC DEVICES WITH BIPYRIDINIUM SALT SOLUTIONS," issued Aug. 9, 1994, to H. J. Byker; U.S. Pat. No. 5,434,407, entitled "AUTOMATIC REARVIEW MIRROR INCORPORATING LIGHT PIPE," issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; and U.S. Pat. No. 5,451,822, entitled "ELECTRONIC CONTROL SYSTEM," issued Sep. 19, 1995, to J. H. Bechtel et al., each of which patents is assigned to the assignee of the present invention and the disclosures of each of which are hereby incorporated herein by reference, are typical of modern day automatic rearview mirrors for motor vehicles. Such electrochromic mirrors may be utilized in a fully integrated inside/outside rearview mirror system or as an inside or an outside rearview mirror system. In general, in automatic rearview mirrors of the types disclosed in the above referenced U.S. patents, both the inside and the outside rearview mirrors are comprised of a relatively thin electrochromic medium sandwiched and sealed between two glass elements.

In most cases, when the electrochromic medium, which functions as the media of variable transmittance in the mirrors is electrically energized, it darkens and begins to absorb light, and the more light the electrochromic medium absorbs the darker the mirror becomes. When the electrical voltage is decreased to zero, the mirror returns to its clear state. In general, the electrochromic medium sandwiched and sealed between the two glass elements is comprised of self-erasing solutions of electrochromic materials, although other electrochromic media may be utilized, including an approach wherein a tungsten oxide electrochromic layer is coated on one electrode with a solution containing another redox active material to provide counter electrode reaction. When operated automatically, the rearview mirrors of the indicated character generally incorporate light-sensing electronic circuitry which is effective to change the mirrors to the dimmed reflectance modes when glare is detected, the sandwiched electrochromic medium being activated and the mirror being dimmed in proportion to the amount of glare that is detected. As glare subsides, the mirror automatically returns to its normal high reflectance state without any action being required on the part of the driver of the vehicle.

The electrochromic medium is disposed in a sealed chamber defined by a transparent front glass element, a peripheral edge seal, and a rear mirror element having a reflective layer, the electrochromic medium filling the chamber. Conductive layers are provided on the inside of the front and rear glass elements, the conductive layer on the front glass element being transparent while the conductive layer on the rear glass element may be transparent or the conductive layer on the rear glass element may be semi-transparent or opaque and may also have reflective characteristics and function as the reflective layer for the mirror assembly. The conductive layers on both the front glass element and the rear glass element are connected to electronic circuitry which is effective to electrically energize the electrochromic medium to switch the mirror to nighttime, decreased reflectance modes when glare is detected and thereafter allow the mirror to return to the daytime, high reflectance mode when the glare subsides as described in detail in the aforementioned U.S. patents. For clarity of description of such a structure, the front surface of the front glass element is sometimes referred to as the first surface, and the inside surface of the front glass element is sometimes referred to as the second surface. The inside surface of the rear glass element is sometimes referred to as the third surface, and the back surface of the rear glass element is sometimes referred to as the fourth surface.

Although outside mirror assemblies exist that include signal lights and other outside mirror assemblies exist that include electrochromic mirrors, signal lights have not been provided in mirror assemblies having an electrochromic mirror because the dichroic coating needed to hide the LEDs of the signal light, typically cannot be applied to an electrochromic mirror, particularly those mirrors that employ a third surface reflector/electrode.

In the past, information, images or symbols from displays such as vacuum fluorescent displays have been displayed on electrochromic rearview mirrors for motor vehicles with reflective layers on the fourth surface of the mirror. The display is visible to the vehicle occupant by removing all of the reflective layer on a portion of the fourth surface and placing the display in that area. Although this design works adequately due to the transparent conductors on the second and third surface to impart current to the electrochromic medium, presently no design is commercially available which allows a display device to be incorporated into a mirror that has a reflective layer on the third surface. Removing all of the reflective layer on the third surface in the area aligned with the display area or the glare sensor area causes severe residual color problems when the electrochromic medium darkens and clears because, although colorization occurs at the transparent electrode on the second surface, there is no corresponding electrode on the third surface in that corresponding area to balance the charge. As a result, the color generated at the second surface (across from the display area or the glare sensor area) will not darken or clear at the same rate as other areas with balanced electrodes. This color variation is significant and is very aesthetically unappealing to the vehicle occupants.

SUMMARY OF THE INVENTION

Accordingly, it is an aspect of the present invention to solve the above problems to provide a rearview mirror assembly for a vehicle comprising an electrochromic mirror and a signal light mounted behind the electrochromic mirror for selectively projecting light through the electrochromic mirror.

Another aspect of the present invention is to provide a rearview mirror assembly including a signal light or display whereby the signal light or display is covertly hidden behind the mirror and yet viewable when activated. To achieve this and other aspects and advantages, the rearview mirror of the present invention comprises a mirror including a transparent substrate, a reflective coating formed on a surface of the substrate, and a partially transmissive/reflective area disposed within the reflective coating, the partially transmissive/reflective area having regions containing reflective material and regions substantially devoid of reflective material; and a light source mounted behind the partially transmissive/reflective area of the mirror for selectively projecting light through the mirror, wherein the reflective material is effective to reflect light through the substrate when the light reaches the reflective material after passing through the substrate.

Still another aspect of the present invention is to provide an electrochromic mirror and signal light that does not require the use of any dichroic coatings. To achieve this and other aspects and advantages, the rearview mirror assembly of the present invention comprises an electrochromic mirror and a signal light mounted behind the electrochromic mirror for selectively projecting light through the electrochromic mirror, wherein the electrochromic mirror includes front and rear spaced elements sealably bonded together in a spaced-apart relationship to define a chamber therebetween; a reflective coating including at least one layer of a reflective material disposed on a surface of the rear element; an electrochromic reversibly variable transmittance medium contained in said chamber; and a signal light area disposed within the reflective coating in front of the signal light, the signal light area having regions containing reflective material and regions substantially devoid of reflective material, wherein the reflective material is effective to reflect light through the electrochromic medium and the front element when the light reaches the reflective material after passing through the front element and the electrochromic medium.

These and other features, advantages, and objects of the present invention will be further understood and appreciated by those skilled in the art by reference to the following specification, claims, and appended drawings.

BRIEF DESCRIPTION OF THE DRAWINGS

The subject matter that is regarded as the invention is particularly pointed out and distinctly claimed in the concluding portion of the specification. The invention, together with further objects and advantages thereof, may best be understood by reference to the following description taken in connection with the accompanying drawings, where like numerals represent like components, in which:

DETAILED DESCRIPTION OF THE PREFERRED EMBODIMENTS

Figure 1:
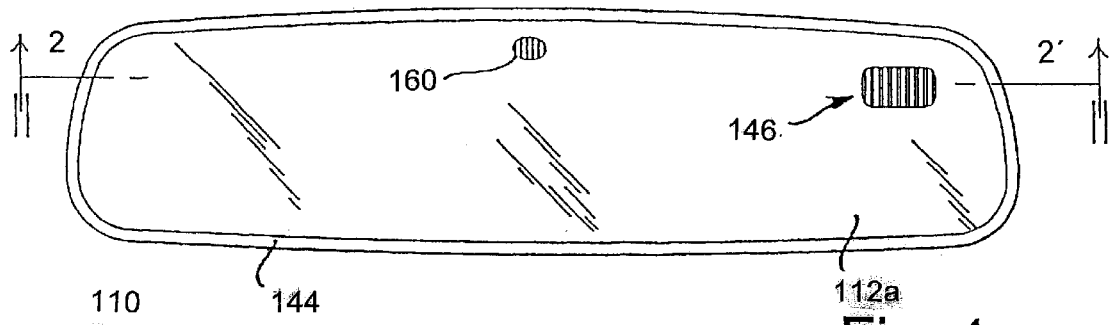
FIG. 1 is a front elevational view of an automatic rearview mirror embodying the information display area of a first embodiment of the present invention.

FIG. 1 shows a front elevational view schematically illustrating an inside mirror assembly 110 according to the first embodiment of the present invention, which is adapted to be installed on a motor vehicle in a conventional manner and where the mirror faces the rear of the vehicle and can be viewed by the driver of the vehicle to provide a rearward view to the driver. Inside mirror assembly 110 may incorporate light-sensing electronic circuitry of the type illustrated and described in the above-referenced Canadian Pat. No. 1,300,945, U.S. Pat. No. 5,204,778, or U.S. Pat. No. 5,451,822, and other circuits capable of sensing glare and ambient light and supplying a drive voltage to the electrochromic element.

Rearview mirrors embodying the present invention preferably include a bezel 144, which extends around the entire periphery of mirror assembly 110. The bezel 144 conceals and protects the spring clips (not shown) and the peripheral edge portions of the sealing member and both the front and rear glass elements (described in detail below). A wide variety of bezel designs are well known in the art, such as, for example, the bezel disclosed in above-referenced U.S. Pat. No. 5,448,397. There are also a wide variety of known housings for attaching the mirror assembly 110 to the inside front windshield of an automobile; a preferred housing is disclosed in above-referenced U.S. Pat. No. 5,337,948.

The electrical circuit preferably incorporates an ambient light sensor (not shown) and a glare light sensor 160, the glare light sensor being capable of sensing glare light and being typically positioned behind the glass elements and looking through a section of the mirror with the reflective material partially removed in accordance with the present invention. Alternatively, the glare light sensor can be positioned outside the reflective surfaces, e.g., in the bezel 144. Additionally, an area or areas of the third surface reflective electrode, such as 146, may be partially removed in accordance with the present invention to permit a display, such as a compass, clock, or other indicia, to show through to the driver of the vehicle. The present invention is also applicable to a mirror which uses only one video chip light sensor to measure both glare and ambient light and which is further capable of determining the direction of glare. An automatic mirror on the inside of a vehicle, constructed according to this invention, can also control one or both outside mirrors as slaves in an automatic mirror system.

Figure 2:
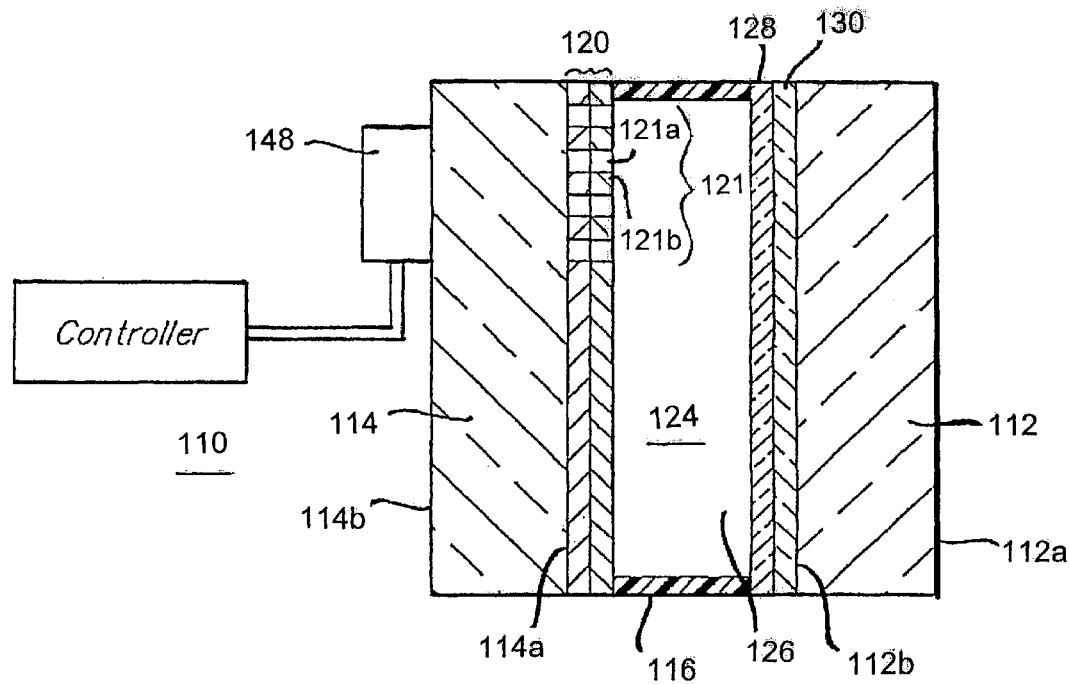
FIG. 2 is an enlarged cross-sectional view, with portions broken away for clarity of illustration, of the automatic rearview mirror illustrated in FIG. 1.

FIG. 2 shows a cross-sectional view of mirror assembly 110 along the line 2–2'. Mirror 110 has a front transparent element 112 having a front surface 112a and a rear surface 112b, and a rear element 114 having a front surface 114a and a rear surface 114b. Since some of the layers of the mirror are very thin, the scale has been distorted for pictorial clarity. Also, for clarity of description of such a structure, the following designations will be used hereinafter. The front surface of the front glass element (as viewed by a vehicle occupant) will be referred to as the first surface, and the back surface of the front glass element as the second surface. The front surface of the rear glass element will be referred to as the third surface, and the back surface of the rear glass element as the fourth surface.

Front transparent element 112 may be any material which is transparent and has sufficient strength to be able to operate in the conditions, e.g., varying temperatures and pressures, commonly found in the automotive environment. Front element 112 may comprise any type of borosilicate glass, soda lime, float glass or any other material, such as, for example, a polymer or plastic that is transparent in the visible region of the electromagnetic spectrum. Front element 112 is preferably a sheet of glass. Rear element 114 must meet the operational conditions outlined above, except that it does not need to be transparent, and therefore may comprise polymers, metals, glass, ceramics, and preferably is a sheet of glass. Front and rear elements typically have thicknesses of about 2 mm, but may optionally be much thinner if combined with a gel medium as disclosed in commonly assigned U.S. Pat. No. 5,940,201 entitled "A ELECTROCHROMIC MIRROR WITH TWO THIN GLASS ELEMENTS AND A GELLED ELECTROCHROMIC MEDIUM" and filed on Apr. 2, 1997, the entire disclosure of which is incorporated herein by reference.

A layer of a transparent electrically conductive material 128 is deposited on the second surface 112b to act as an electrode. Transparent conductive material 128 may be any material which bonds well to front element 112, is resistant to corrosion to any materials within the electrochromic device, resistant to corrosion by the atmosphere, has minimal diffuse or specular reflectance, high light transmission, neutral coloration and good electrical conductance. Transparent conductive material 128 may be fluorine doped tin oxide, tin doped indium oxide (ITO), ITO/metal/ITO (IMI) as disclosed in "TRANSPARENT CONDUCTIVE MULTILAYER-SYSTEMS FOR FPD APPLICATIONS," by J. Stollenwerk, B. Ocker, K. H. Kretschmer of LEYBOLD AG, Alzenau, Germany, and the materials described in above-referenced U.S. Pat. No. 5,202,787, such as TEC 20 or TEC 15, available from Libbey Owens-Ford Co. of Toledo, Ohio. Generally, the conductivity of transparent conductive material 128 will depend on its thickness and composition. The transparent conductive material should adhere well to the second (glass) surface 112b, and maintain this bond when the epoxy seal 116 bonds thereto. If desired, an optional layer or layers of a color suppression material 130 may be deposited between transparent conductive material 128 and front glass rear surface 112b to suppress the reflection of any unwanted portion of the electromagnetic spectrum.

At least one layer of a material that acts as both a reflector and a conductive electrode 120 is disposed on third surface 114a of mirror 110. U.S. patent application Ser. No. 08/832,596 entitled "DIMMABLE REARVIEW MIRROR INCORPORATING A THIRD SURFACE METAL REFLECTOR" and filed on Apr. 2, 1997, now U.S. Pat. No. 6,020,987, describes reflector/electrode 120 in detail. The entire disclosure of this co-pending U.S. patent application is incorporated herein by reference. Generally speaking, the transparent conductive electrode on the third surface is replaced with a layer that is conductive and reflective (reflector/electrode 120). The reflector/electrode typically has a base layer that bonds well to the glass surface 114a and a highly reflecting layer disposed over the base layer. Optionally, an intermediate layer may be placed between the base layer and the highly reflecting layer and, additionally, a very thin flash over coating may be placed over the highly reflecting layer to improve the ruggedness of the reflector/electrode 120. Since a third surface reflector/electrode 120 has a higher conductivity than a conventional transparent electrode, it allows greater design flexibility. The combination of a high conductivity reflector/electrode on the third surface and a high conductivity transparent electrode on the second surface will not only produce an electrochromic device with more even and better overall coloration, but will also increase speed of coloration and clearing. The third surface reflector/electrode 120 should preferably adhere well to the third (glass) surface 114a, and maintain this bond when the epoxy seal 116 bonds thereto.

The coating 120 of the third surface 114a is sealably bonded to the coating 128 on the second surface 112b around their outer perimeters by a seal member 116. Preferably, seal member 116 contains glass beads (not shown) to hold transparent elements 112 and 114 in a parallel and spaced-apart relationship. Seal member 116 may be any material which is capable of adhesively bonding the coatings on the second surface 112b to the coatings on the third surface 114a to seal the perimeter, such that electrochromic medium 126 does not leak from chamber 124 while simultaneously maintaining a generally constant distance therebetween. Optionally, the layer of transparent conductive coating 128 and/or the layer of reflector/electrode 120 may be removed over a major portion where seal member 116 is disposed (not the entire portion, otherwise the drive potential could not be applied to the two coatings). In such a case, seal 116 member must bond well to glass.

The performance requirements for a perimeter seal member 116 used in an electrochromic device are similar to those for a perimeter seal used in a liquid crystal device (LCD), which are well known in the art. The seal must have good adhesion to glass, metals, and metal oxides; must have low permeabilities for oxygen, moisture vapor and other detrimental vapors and gases; and must not interact with or poison the electrochromic or liquid crystal material it is meant to contain and protect. The perimeter seal can be applied by means commonly used in the LCD industry, such as by silk-screening or dispensing. Totally hermetic seals, such as those made with glass frit or solder glass, can be used, but the high temperatures involved in processing (usually near 450° C.) this type of seal can cause numerous problems, such as glass substrate warpage, changes in the properties of transparent conductive electrode, and oxidation or degradation of the reflector. Because of their lower processing temperatures, thermoplastic, thermosetting, or UV curing organic sealing resins are preferred. Such organic resin sealing systems for LCDs are described in U.S. Pat. Nos. 4,297,401, 4,418,102, 4,695,490, 5,596,023 and 5,596,024. Because of their excellent adhesion to glass, low oxygen permeability and good solvent resistance, epoxy based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage, such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures mono-functional, di-functional and multi-functional epoxy resins and curing agents. Additives such as silanes or titanates can be used to improve the seal's hydrolytic stability, and spacers such as glass beads or rods can be used to control final seal thickness and substrate spacing. Suitable epoxy resins for use in a perimeter seal member 116 include but are not limited to: "EPON RESIN" 813, 825, 826, 828, 830, 834, 862, 1001F, 1002F, 2012, DPS-155, 164, 1031, 1074, 58005, 58006, 58034, 58901, 871, 872 and DPS-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510 and PT 810 available from Ciba Geigy, Hawthorne, N.Y.; "D.E.R." 331, 317, 361, 383, 661, 662, 667, 732, 736, "D.E.N." 431, 438, 439 and 444 available from Dow Chemical Co., Midland, Mich. Suitable epoxy curing agents include V-15, V-25 and V40 polyamides from Shell Chemical Co.; "AJICURE" PN-23, PN-34 and VDH available from Ajinomoto Co., Tokyo, Japan; "CUREZOL" AMZ, 2MZ, 2E4MZ, C11Z, C17Z, 2PZ, 2IZ and 2P4MZ available from Shikoku Fine Chemicals, Tokyo, Japan; "ERISYS" DDA or DDA accelerated with U-405, 24EMI, U-410 and U-415 available from CVC Specialty Chemicals, Maple Shade, N.J.; "AMICURE" PACM, 352, CG, CG-325 and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, EH-5 available from Cabot Corporation, Tuscola, Ill.; "AEROSIL" R972, R974, R805, R812, R812 S, R202, US204 and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, TRANSLINK 555 available from Engelhard Corporation, Edison, N.J. Suitable silica fillers are SILCRON G-130, G-300, G-100-T and G-100 available from SCM Chemicals, Baltimore, Md. Suitable silane coupling agents to improve the seal's hydrolytic stability are Z-6020, Z-6030, Z-6032, Z-6040, Z-6075 and Z-6076 available from Dow Corning Corporation, Midland, Mich. Suitable precision glass microbead spacers are available in an assortment of sizes from Duke Scientific, Palo Alto, Calif.

Chamber 124, defined by transparent conductor 128 (disposed on front element rear surface 112b), reflector/electrode 120 (disposed on rear element front surface 114a), and an inner circumferential wall of sealing member 116, is filled with an electrochromic medium 126. Electrochromic medium 126 may be a wide variety of media capable of changing properties such that light traveling therethrough is attenuated such as, for example, including solution-phase redox, solid-state, and metal or viologen salt deposition; however, the presently preferred media are solution phase redox electrochromics, such as those disclosed in above-referenced U.S. Pat. Nos. 4,902,108, 5,128,799, 5,278,693, 5,280,380, 5,282,077, 5,294,376, and 5,336,448. Thus, during operation, light rays enter through the front glass 112, the transparent conductive layer 128, and the electrochromic medium 126, before being reflected from the reflector/electrode 120 provided on the third surface 114a of the mirror 110. Light in the reflected rays exits by the same general path traversed in the reverse direction. Both the entering rays and the reflected rays are attenuated in proportion to the degree to which the electrochromic medium 126 is light absorbing.

The layer or layers of reflector/electrode 120 should be stable when in contact with the electrochromic medium 126 (which may include semi-aqueous materials, organic materials, oxygenated materials, acidic materials, and/or conductive materials) both when a potential is applied between the reflector/electrode 120 and the transparent electrode 128 and when no potential is applied. The reflector/electrode 120 should not significantly degrade when exposed to UV radiation or when contacted with another metal (typically at the edges for electrical connection to the electronic control circuit), and preferably has the proper conductance for applying the drive voltage. The reflector/electrode 120 should preferably have superior reflectance properties, e.g., having high specular reflectance and color neutrality. Since a portion of all of the layer or layers of reflector/electrode 120 is removed and they will therefore be in contact with the electrochromic medium, all layers must be stable when in contact with the electrochromic medium.

Figure 3:
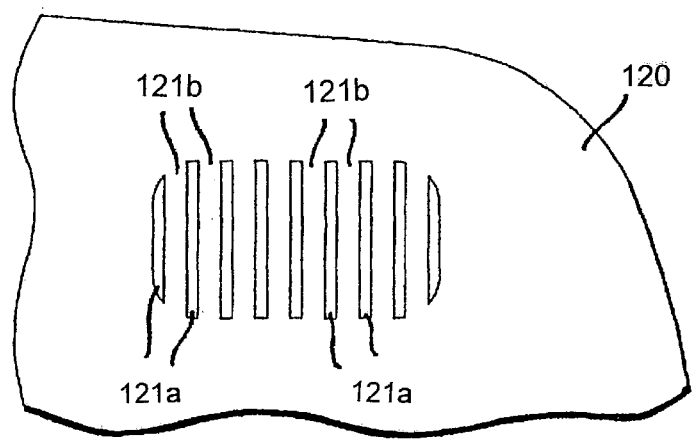
FIG. 3 is a front elevational view of the information display area, with portions broken away for clarity of illustration, of the automatic rearview mirror illustrated in FIG. 1.

In accordance with the present invention, a portion of conductive reflector/electrode 120 is removed to leave an information display area 121 comprised of a non-conducting area 121*a* (to view a display) and a conducting area 121*b* (to color and clear the electrochromic medium), as shown in FIG. 2. Although only shown in detail for the display area 121, the same design may be, and preferably is, used for the glare sensor area (160 in FIG. 1). FIG. 3 shows a front elevational view illustrating information display area 121. Again, since some of the layers of this area are very thin, the scales of the figures have been distorted for pictorial clarity. The portion of conductive reflector/electrode that is removed 121*a* is substantially devoid of conductive material, and the portion not removed should be in electrical contact with the remaining area of reflector/electrode 120. That is to say, there are little or no isolated areas or islands of reflector/electrode 120 that are not electrically connected to the remaining portions of the reflector/electrode 120. Also, although the etched areas 121*a* are shown as U-shaped (FIG. 2), they may have any shape that allows sufficient current flow through lines 121*b* while allowing the driver to view and read the display 148 through etched areas 121*a*. The reflector/electrode 120 may be removed by varying techniques, such as, for example, by etching (laser, chemical, or otherwise), masking during deposition, mechanical scraping, sandblasting, or otherwise. Laser etching is the presently preferred method because of its accuracy, speed, and control.

The information display area 121 is aligned with a display device 148 such as a vacuum fluorescent display, cathode ray tube, liquid crystal, flat panel display and the like, with vacuum fluorescent display being presently preferred. The display 148, having associated control electronics, may exhibit any information helpful to a vehicle occupant, such as a compass, clock, or other indicia, such that the display will show through the removed portion 121*a* to the vehicle occupant.

The area that is substantially devoid of conductive reflector/electrode 121*a* and the area having conductive reflector/electrode present 121*b* may be in any shape or form so long as there is sufficient area having conductive material to allow proper coloring and clearing (i.e., reversibly vary the transmittance) of the electrochromic medium, while at the same time having sufficient area substantially devoid of conductive material to allow proper viewing of the display device 148. As a general rule, information display area 121 should have approximately 70–80 percent of its area substantially devoid of conductive material 121*a* and the conductive material 121*b* filling the remaining 20—30 percent. The areas (121*a* and 121*b*) may have a variety of patterns such as, for example, linear, circular, elliptical, etc. It is presently preferred that areas 121*a* and 121*b* form alternating and contiguous lines (see FIG. 3). By way of example, and not to be construed in any way as limiting the scope of the present invention, the lines 121*b* generally may be approximately 0.002 inch wide and spaced approximately 0.006 inch apart from one another by the lines substantially devoid of conductive material. It should be understood that although the figures show the lines to be vertical (as viewed by the driver), they may be horizontal or at some angle from vertical. Further, lines 121*a* need not be straight, although straight vertical lines are presently preferred.

If all of the third surface reflector/electrode 120 is removed in the information display area 121 or in the area aligned with the glare light sensor 160, there will be significant coloration variations between those areas and the remaining portion of the mirror where the reflector/electrode 120 is not removed. This is because for every electrochromic material oxidized at one electrode there is a corresponding electrochromic material reduced at the other electrode. The oxidation or reduction (depending on the polarity of the electrodes) that occurs on the second surface directly across from the information display area 121 will occur uniformly across the area of the information display area. The corresponding electrochemistry on the third surface will not, however, be uniform. The generation of light-absorbing species will be concentrated at the edges of the information display area (which is devoid of reflector/electrode). Thus, in the information display area 121, the generation of the light-absorbing species at the second surface will be uniformly distributed, whereas the light-absorbing species at the third surface will not, thereby creating aesthetically unappealing color discrepancies to the vehicle occupants. By providing lines of reflector/electrode 120 areas throughout the information display area 121, in accordance with the present invention, the generation of light-absorbing species (at the second and third surfaces) in the information display area will be much closer to the uniformity seen in other areas of the mirror with completely balanced electrodes.

Although those skilled in the art will understand that many modifications may be made, the laser etching may be accomplished by using a 50 watt Nd:YAG laser, such as that made by XCEL Control Laser, located in Orlando, Fla. In addition, those skilled in the art will realize that the power settings, the laser aperture, the mode of the laser (continuous wave or pulsed wave), the speed with which the laser moves across the surface, and the wave form of the laser may be adjusted to suit a particular need. In commercially available lasers there are various wave forms that the laser follows while it ablates the surface coatings. These wave forms include straight lines, sine waves at various frequencies and ramp waves at various frequencies, although many others may be used. In the presently preferred embodiments of the present invention, the areas devoid of reflective material 121*a* are removed by using the laser in a pulsed wave mode with a frequency of about 3 KHz, having a narrow (e.g., around 0.005 inch) beam width where the laser is moved in a straight line wave form.

Figure 4:
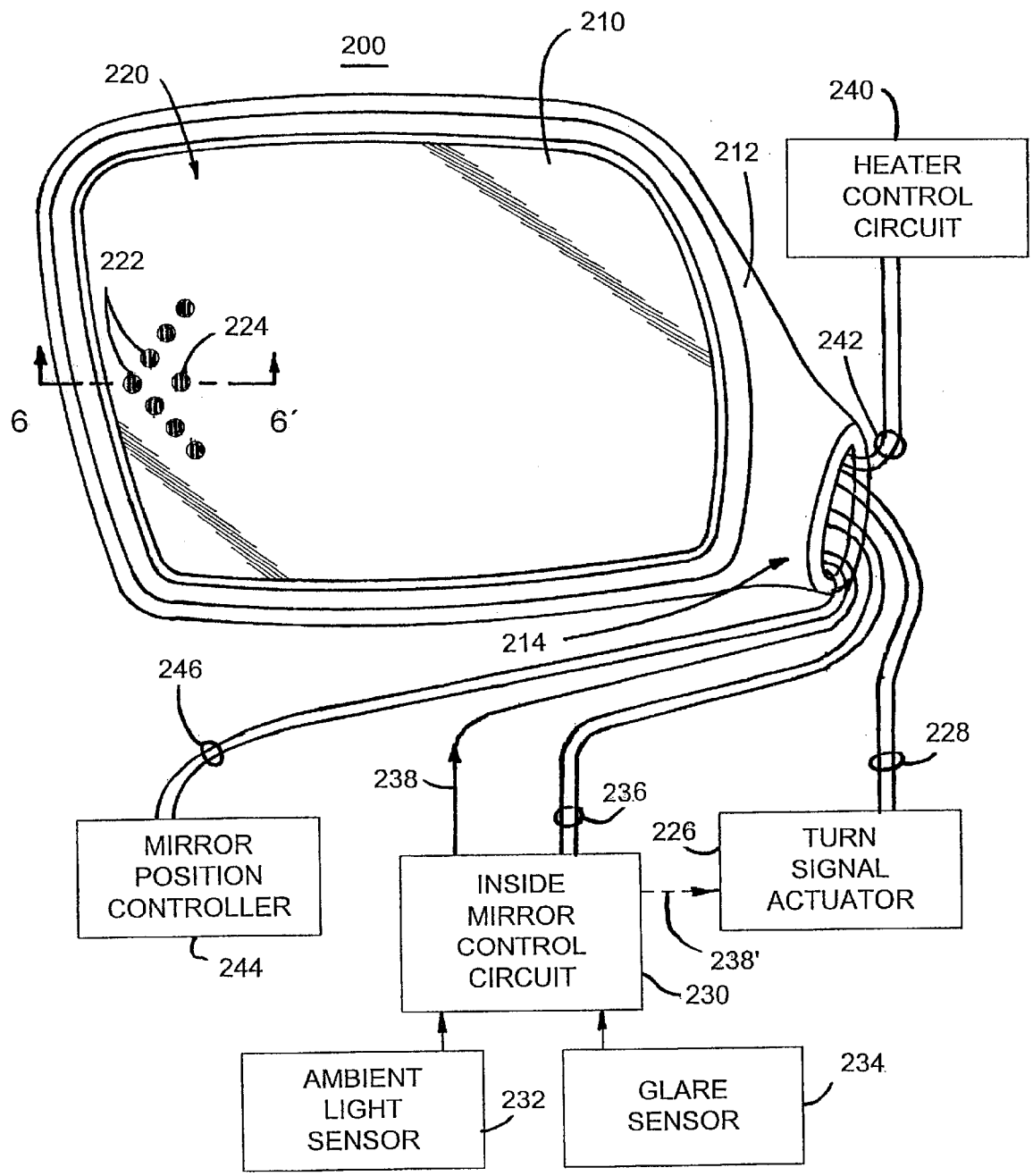
FIG. 4 is a perspective view of an outside automatic rearview mirror including a signal light and an electrical circuit diagram in block form of an outside rearview mirror assembly constructed in accordance with a second embodiment of the present invention.

FIG. 4 shows an outside rearview mirror assembly 200 constructed in accordance with a second embodiment of the present invention. Outside rearview mirror assembly 200 includes a mirror 210, which is preferably an electrochromic mirror, an external mirror housing 212 having a mounting portion 214 for mounting mirror assembly 200 to the exterior of a vehicle, and a signal light 220 mounted behind mirror 210. To enable the light from signal light 220 to project through electrochromic mirror 210, a plurality of signal light areas 222 are formed in the reflective coating of mirror 210 that include regions containing reflective material and regions substantially devoid of reflective material similar to the information display area and glare sensor area described above with respect to the first embodiment of the present invention. Electrochromic mirror 210 may further include a sensor area 224 disposed within the reflective coating on electrochromic mirror 210 and similarly include regions containing reflective material and regions substantially devoid of reflective material so as to reflect some of the incident light and yet allow the remainder of the incident light to reach a sensor mounted behind sensor area 224.

Figure 7:
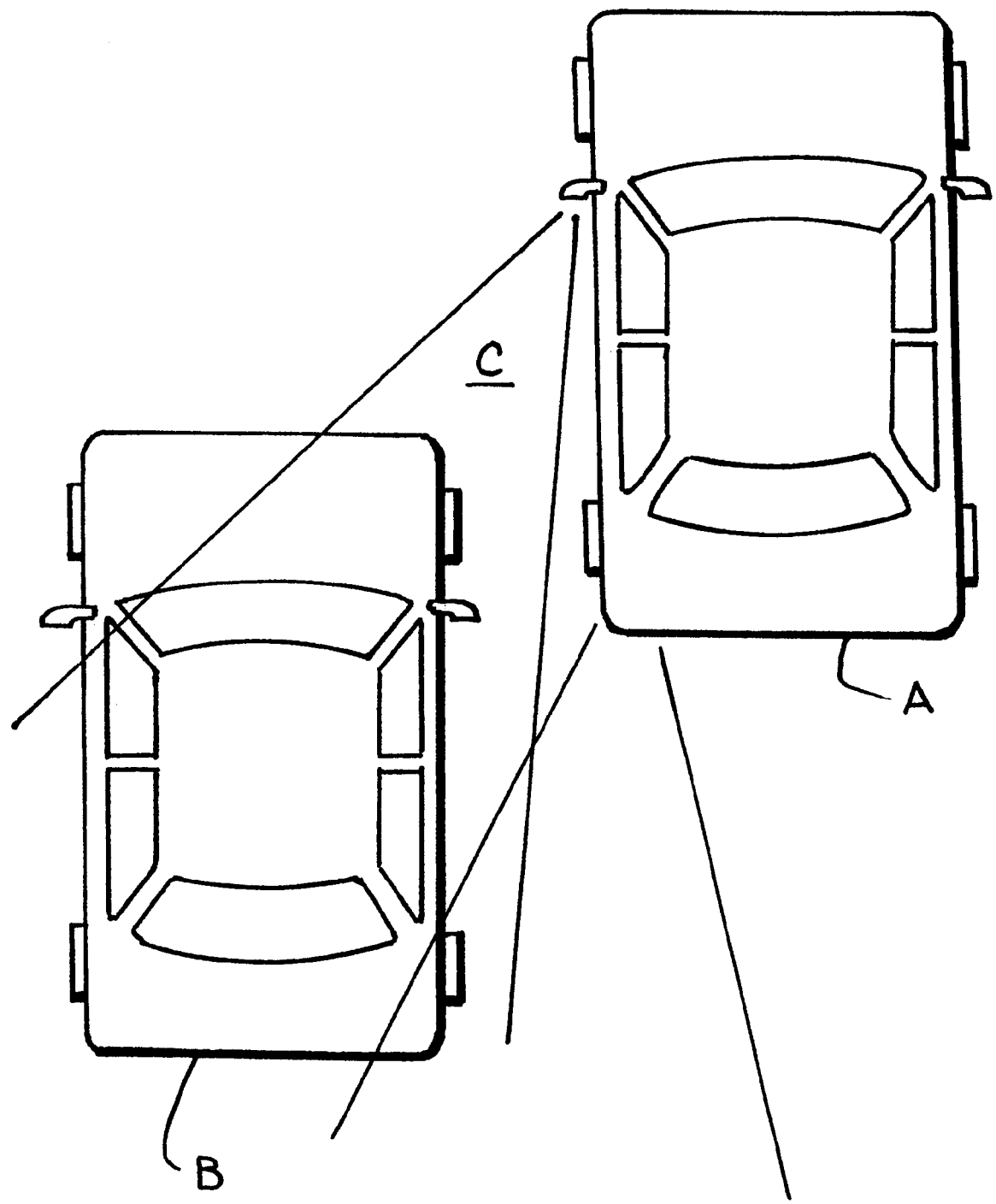
FIG. 7 is a pictorial representation of two vehicles, one of which includes the signal mirror of the present invention.

Signal light 220 is preferably provided to serve as a turn signal light and is thus selectively actuated in response to a control signal generated by a turn signal actuator 226. The control signal is therefore applied to signal light 220 as an intermittent voltage so as to energize signal light 220 when a driver has actuated the turn signal lever. As shown in FIG. 7, when vehicle B is in the blind spot of vehicle A where the driver of vehicle A cannot see vehicle B, the driver of vehicle B cannot see the turn signal on the rear of vehicle A. Thus, if the driver of vehicle A activates the turn signal, and attempts to change lanes while vehicle B is in a blind spot, the driver of vehicle B may not receive any advance notice of the impending lane change, and hence, may not be able to avoid an accident. By providing a turn signal light in an outside rearview mirror assembly 200 of vehicle A, the driver of an approaching vehicle B will be able to see that the driver of vehicle A is about to change lanes and may thus take appropriate action more quickly so as to avoid an accident. As illustrated In FIG. 7 and described in more detail below, the signal light is preferably mounted within mirror assembly an angle to the mirror surface to project the light from the signal light outward into the adjacent lanes in the blind spot areas proximate the vehicle.

Referring again to FIG. 4, electrochromic mirror 220 may be controlled in a conventional manner by a mirror control circuit 230 provided in the inside rearview mirror assembly. Inside mirror control circuit 230 receives signals from an ambient light sensor 232, which is typically mounted in a forward facing position on the interior rearview mirror housing. Control circuit 230 also receives a signal from a glare sensor 234 mounted in a rearward facing position of the interior rearview mirror assembly. Inside mirror control circuit 230 applies a control voltage on a pair of lines 236 in a conventional manner, such that a variable voltage is applied essentially across the entire surface of electrochromic mirror 210. Thus, by varying the voltage applied to lines 236, control circuit 230 may vary the transmittance of the electrochromic medium in mirror 210 in response to the light levels sensed by ambient sensor 232 and glare sensor 234. As will be explained further below, an optional third control line 238 may be connected between the inside mirror control circuit 230 and a variable attenuator 260 provided in outside mirror assembly 200, so as to selectively attenuate the energizing signal applied on lines 228 from turn signal actuator 226 to the signal light 220 in response to the control signal sent on line 238. In this manner, inside mirror control circuit 230 may selectively and remotely control the intensity of signal light 220 based upon information obtained from sensors 232 and 234 and thereby eliminate the need for a sensor to be mounted in each mirror assembly as well as the associated sensor area 224.

Mirror assembly 200 may further include an electric heater (not shown) provided behind mirror 210 that is selectively actuated by a heater control circuit 240 via lines 242. Such heaters are known in the art to be effective for deicing and defogging such external rearview mirrors. Mirror assembly 200 may optionally include a mirror position servomotor (not shown) that is driven by a mirror position controller 244 via lines 246. Such mirror position servomotors and controls are also known in the art. As will be appreciated by those skilled in the art, mirror assembly 200 may include additional features and elements as are now known in the art or may become known in the future without departing from the spirit and scope of the present invention.

Figure 5:
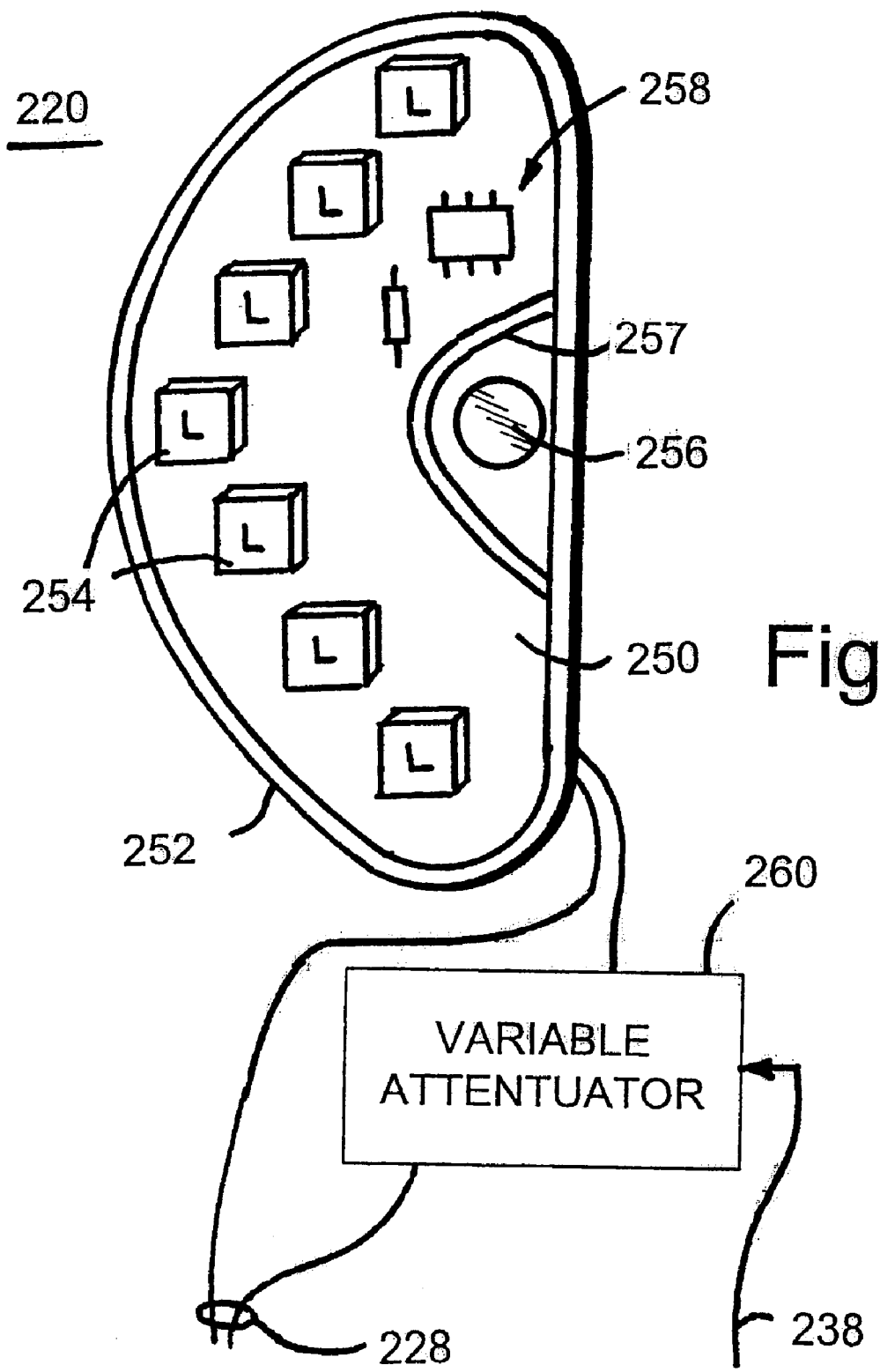
FIG. 5 is a front elevational view of a signal light subassembly that may be used in the outside mirror assembly of the second embodiment of the present invention.

An exemplary signal light subassembly 220 is shown in FIG. 5. Such a signal light 220 is disclosed in U.S. Pat. Nos. 5,361,190 and 5,788,357, which disclose the signal light in combination with dichroic exterior rearview mirrors that are not electrochromic. The disclosures of the signal light assembly in U.S. Pat. Nos. 5,361,190 and 5,788,357 is incorporated herein by reference. As explained below, however, the same signal light subassembly may be used in connection with an electrochromic mirror as may modified versions of the signal light subassembly shown in FIG. 5.

As shown in FIG. 5, signal light 220 includes a printed circuit board 250 that, in turn, is mounted within a housing 252 having a peripheral edge that serves as a shroud (see FIGS. 6A and 6B) to block any stray light from exiting the signal light assembly. Signal light 220 preferably includes a plurality of LEDs 254 that are mounted to circuit board 250. LEDs 254 may be mounted in any pattern, but are preferably mounted in a pattern likely to suggest to other vehicle operators that the vehicle having such signal mirrors is about to turn. LEDs 254 may be LEDs that emit red or amber light or any other color light as may prove desirable. LEDs 254 are also preferably mounted to circuit board 250 at an angle away from the direction of the driver. By angling LEDs relative to mirror 210, the light projected from LEDs 254 may be projected outward away from the driver towards the area C in which the driver of another vehicle would be more likely to notice the signal light, as shown in FIG. 7. Hence, the potential glare from the signal light as viewed by the driver may be effectively reduced.

Signal light 220 may optionally include a day/night sensor 256 also mounted to circuit board 250. If sensor 256 is mounted on circuit board 250, a shroud 257 is also preferably mounted to shield sensor 256 from the light generated by LEDs 254. Also, if sensor 256 is provided in signal light 220, a day/night sensing circuit 258 may also be mounted on circuit board 250 so as to vary the intensity of LEDs 254 in response to the detection of the presence or absence of daylight by sensor 256. Thus, if sensor 256 detects daylight, circuit 258 increases the intensity of the light emitted from LEDs 254 to their highest level and decreases the intensity of the emitted light when sensor 256 detects that it is nighttime. The above-noted signal light disclosed in U.S. Pat. Nos. 5,361,190 and 5,788,357, includes such a day/night sensor 256 and associated control circuit 258, and therefore, further description of the operation of the signal light in this regard will not be provided.

As an alternative to providing a day/night sensor 256 in each of the vehicle's exterior rearview mirrors, a variable attenuator 260 or other similar circuit may be provided to vary the driving voltage applied from the turn signal actuator 226 on line 228 in response to a control signal delivered from inside mirror control circuit 230 on a dedicated line 238. In this manner, inside mirror control circuit 230 may utilize the information provided from ambient light sensor 232 as well as the information from glare sensor 234 to control the intensity of the light emitted from LEDs 254 and signal light 220. Since the ambient light and glare sensors 232 and 234 are already provided in an internal electrochromic rearview mirror, providing for such remote control by the inside mirror control circuit 230 eliminates the need for providing additional expensive sensors 256 in the signal light 220 of each exterior mirror assembly. As an alternative to running a separate wire 258 to each of the outside rearview mirrors, variable attenuator 260 may be provided in the dashboard proximate the turn signal actuator or otherwise built into the turn signal actuator, such that a single control line 238' may be wired from inside mirror control circuit 230 to the turn signal actuator as shown in FIG. 4.

The intensity of the light emitted from the LEDs may thus be varied as a function of the light level sensed by ambient sensor 232 or glare sensor 234, or as a function of the light levels sensed by both sensors 232 and 234. Preferably, LEDs 254 are controlled to be at their greatest intensity when ambient sensor 232 detects daylight and at a lesser intensity when sensor 232 detects no daylight. Because the transmittance of the electrochromnic medium is decreased when excessive glare is detected using glare detector 234, the intensity of LEDs 254 is preferably correspondingly increased to as to maintain a relatively constant intensity at nighttime.

Figure 6A:
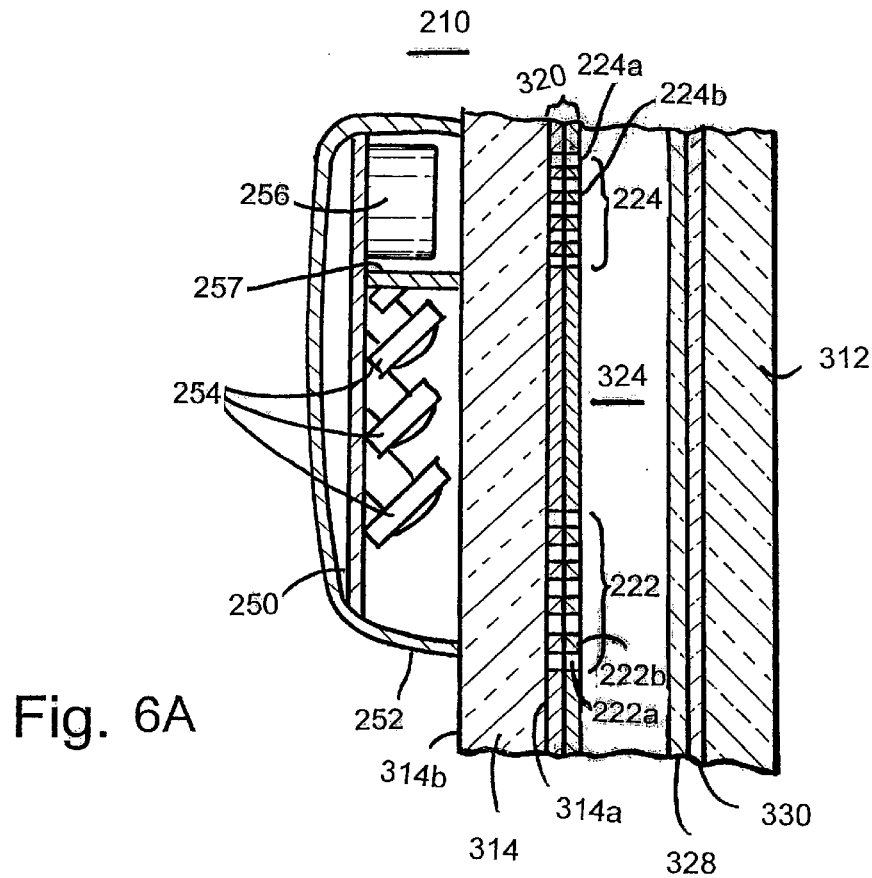
FIG. 6A is a partial cross-sectional view taken along lines 6–6' of FIG. 4 illustrating a first alternative arrangement of the outside rearview mirror constructed in accordance with the second embodiment of the present invention.
Figure 6B:
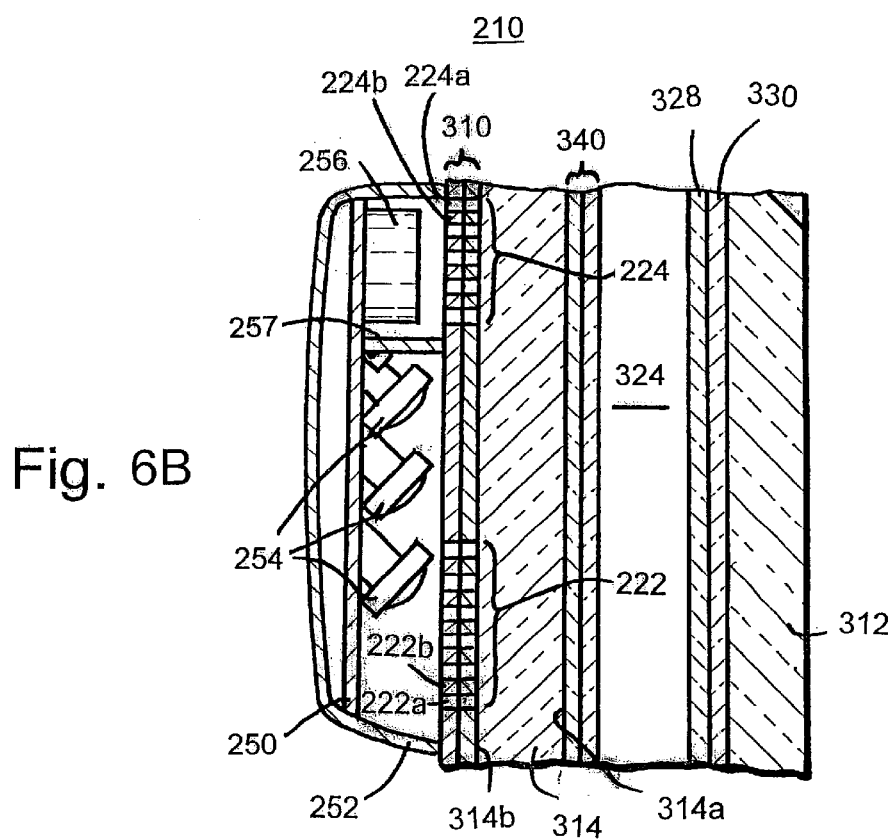
FIG. 6B is a partial cross-sectional view taken along lines 6–6' of FIG. 4 illustrating a second alternative arrangement of the outside rearview mirror constructed in accordance with the second embodiment of the present invention.

FIGS. 6A and 6B show two alternate arrangements for implementing the second embodiment of the present invention. FIGS. 6A and 6B are partial cross-sectional views taken along lines 6–6' of FIG. 4. FIG. 6A shows an arrangement similar to that of the inside rearview mirror shown in FIG. 2 in which parallel lines of reflector/electrode material 222b are provided across the signal light area 222 by either etching out or masking lines 222a in regions that are devoid of the reflector/electrode material. Each of the signal light areas 222 is provided in a position on the rearview mirror corresponding and overlying one of LEDs 254 as apparent from a comparison of FIGS. 4 and 5. Electrochromic mirror 210 may be constructed in the same manner as described above for the inside rearview mirror 110 of the first embodiment. Specifically, mirror 210 includes a front transparent element 312 having a front surface and a rear surface, and a rear element 314 having a front surface 314a and a rear surface 314b. Mirror 210 also includes a layer 328 of a transparent conductive material deposited on the rear surface of front element 312 or on an optional color suppression material 330 that is deposited on the rear surface of front element 312. Additionally, mirror 210 includes at least one layer 320 disposed on a front surface 314a of rear element 314 that acts as both a reflector and a conductive electrode. An electrochromic medium is disposed in a chamber defined between layers 328 and 320. All of the component elements of mirror 210 may be made using the same materials and applied using the same techniques as described above with respect to the first embodiment. Preferably, however, the reflector/electrode material of layer 320 is made using nickel, chrome, rhodium, stainless steel, silver, silver alloys, platinum, palladium, gold, or combinations thereof.

The reflectance of the mirror in the signal light areas 222 or sensor area 224 may also be controlled by varying the percentage of those areas that are devoid of reflective material or by varying the thickness of the reflector/electrode coating. Further, the reflector/electrode material used to form lines 222b in signal light area may be different from the reflector/electrode material used for the remainder of the mirror. For example, a reflector/electrode material having a higher reflectance may be used in the signal light area such that the reflectivity in the signal light area is the same as that of the remainder of the mirror despite the regions therein that are devoid of reflector material. Preferably, the region of the signal light area that is devoid of reflective material constitutes between 30 and 50% of the signal light area and the area occupied by the reflective material is between 50 and 70% of the signal light area. To achieve these percentages, the lines of reflector/electrode material are preferably about 0.010 inch wide and the spaces between the lines are about 0.006 inch wide.

The arrangement shown in FIG. 6B differs from that shown in FIG. 6A in that the reflective material is formed on the fourth surface (i.e., the rear surface 314b of rear element 314). With such an arrangement, the electrode 340 on the third surface is preferably made of a transparent material similar to that of the electrode 328 formed on the rear surface of front element 312. Like the arrangement shown in FIG. 6A, the structure shown in FIG. 6B includes a signal light area 222 having alternating regions of reflective material 222b and regions devoid of such reflective material 222a. In this manner, LEDs 254 may be more covertly hidden from view by the driver and yet light from LEDs 254 may project through all the layers of electrochromic mirror 210 so as to be visible by drivers of other vehicles. Similarly, if a day/night sensor 256 is provided, a sensor area 224 may be provided in the same manner with alternating regions of reflective material 224b and regions that are void of reflective material 224a.

A benefit of utilizing the above-described structure in connection with a signal light is that the use of a dichroic coating may be avoided. Dichroic coatings are generally nonconductive and therefore cannot be used in an electrochromic mirror having a third surface reflector. Also, the only current dichroic coatings that are economically feasible are those that transmit red and infrared light and reflect other colors of light. Thus, to construct a practical signal light, only LEDs that emit red light may be utilized. Accordingly, there is little flexibility in this regard when a dichroic coating is utilized. To the contrary, with the structure of the present invention, any color signal light may be used.

Although the present invention has been described as providing a signal light that is used as a turn signal, it will be appreciated by those skilled in the art that the signal light could function as any other form of indicator or signal light. For example, the signal light could indicate that a door is ajar so as to warn drivers of approaching vehicles that a vehicle occupant may be about to open a door into oncoming traffic, or the light behind the mirror may be an indicator light to indicate that the mirror heaters have been turned on.

While the signal light of the present invention has been described above as preferably being made of a plurality of LEDs, the signal light may nevertheless be made of one or more incandescent lamps, or any other light source, and an appropriately colored filter without departing from the spirit or scope of the present invention.

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein.

What is claimed is:

1. A rearview mirror assembly for a vehicle comprising:
   an electrochromic mirror including:
      front and rear spaced elements, each having front and rear surfaces and being sealably bonded together in a spaced-apart relationship to define a chamber therebetween,
      a layer of transparent conductive material disposed on said rear surface of said front element,
      a reflector/electrode including at least one layer of a conductive reflector/electrode material disposed on said front surface of said rear element, an electrochromic reversibly variable transmittance medium contained in said chamber in contact with said transparent conductive material and said reflector/electrode, and a sensor area disposed within said reflector/electrode, said sensor area having regions containing reflector/electrode and regions substantially devoid of reflector/electrode; and a sensor mounted behind said sensor area of said electrochromic mirror for sensing light transmitted through said electrochromic mirror, wherein said reflector/electrode material is effective to reflect light through said electrochromic medium and said front element when the light reaches said reflector/electrode after passing through said front element and said electrochromic medium.

2. The rearview mirror assembly as defined in claim 1, wherein the region of said sensor area that contains reflector/electrode provides current to reversibly vary the transmittance of said electrochromic medium, and said region devoid of said reflector/electrode allows light to reach said sensor.

3. The rearview mirror assembly as defined in claim 1, wherein said region containing reflector/electrode comprises about 50–70 percent of said sensor area and said region devoid of reflector/electrode comprises about 30–50 percent of said sensor area.

4. The rearview mirror assembly as defined in claim 1, wherein said region containing reflector/electrode is reflective and electrically conductive.

5. The rearview mirror assembly as defined in claim 1, wherein said region containing reflector/electrode includes a plurality of lines of conductive material that are separated by lines substantially devoid of conductive material.

6. The rearview mirror assembly as defined in claim 5, wherein said lines of conductive material and lines devoid of conductive material are vertical.

7. The rearview mirror assembly as defined in claim 5, wherein said lines of conductive material have a width of approximately 0.010 inch and said lines devoid of conductive material have a width of approximately 0.006 inch.

8. The rearview mirror assembly as defined in claim 1, wherein the coloration of the electrochromic medium proximate said sensor area is generally uniform with the coloration of the electrochromic medium in the remaining area of said electrochromic mirror.

9. The rearview mirror assembly as defined in claim 1, and further including a housing in which said electrochromic mirror and said sensor are mounted, said housing having a mounting member for mounting said housing to the exterior of a vehicle.

10. The rearview mirror assembly as defined in claim 1, and further including a housing in which said electrochromic mirror and said sensor are mounted, said housing having a mounting member for mounting said housing to the interior of a vehicle.

11. A rearview mirror assembly for a vehicle comprising:
electrochromic mirror including:
front and rear spaced elements, each having front and rear surfaces and being sealably bonded together in a spaced-apart relationship to define a chamber therebetween,
a layer of transparent conductive material disposed on said rear surface of said front element,
a reflector/electrode including at least one layer of a conductive reflector/electrode material disposed on said front surface of said rear element, an electrochromic reversibly variable transmittance medium contained in said chamber in contact with said transparent conductive material and said reflector/electrode, and a signal light area disposed within said reflector/electrode, said signal light area having regions containing reflector/electrode and regions substantially devoid of reflector/electrode; and a signal light mounted behind said signal light area of said electrochromic mirror for selectively projecting light through said electrochromic mirror, wherein said reflector/electrode material is effective to reflect light through said electrochromic medium and said front element when the light reaches said reflector/electrode after passing through said front element and said electrochromic medium.

12. The rearview mirror assembly as defined in claim 11, wherein the region of said signal light area that contains reflector/electrode provides current to reversibly vary the transmittance of said electrochromic medium, and said region devoid of said reflector/electrode allows viewing of said signal light.

13. The rearview mirror assembly as defined in claim 11, wherein said region containing reflector/electrode comprises about 50–70 percent of said signal light area and said region devoid of reflector/electrode comprises about 30–50 percent of said signal light area.

14. The rearview mirror assembly as defined in claim 11, wherein said region containing reflector/electrode is reflective and electrically conductive.

15. The rearview mirror assembly as defined in claim 11, wherein said region containing reflector/electrode includes a plurality of lines of conductive material that are separated by lines substantially devoid of conductive material.

16. The rearview mirror assembly as defined in claim 15, wherein said lines of conductive material and lines devoid of conductive material are vertical.

17. The rearview mirror assembly as defined in claim 15, wherein said lines of conductive material have a width of approximately 0.010 inch and said lines devoid of conductive material have a width of approximately 0.006 inch.

18. The rearview mirror assembly as defined in claim 11, wherein the coloration of the electrochromic medium proximate said signal light area is generally uniform with the coloration of the electrochromic medium in the remaining area of said electrochromic mirror.

19. The rearview mirror assembly as defined in claim 11 and further including a housing in which said electrochromic mirror and said signal light are mounted, said housing having a mounting member for mounting said housing to the exterior of a vehicle.

20. The rearview mirror assembly as defined in claim 11 and further including:
a glare sensor area disposed within said reflector/electrode having regions containing reflector/electrode and regions substantially devoid of reflector/electrode; and
a glare sensor juxtaposed with said rear surface of said rear element and aligned with said glare sensor area, wherein said reflector/electrode material is effective to reflect light through said electrochromic medium and said front element when the light reaches said reflector/electrode after passing through said front element and said electrochromic medium.

21. An outside rearview mirror assembly for a vehicle comprising:
an electrochromic mirror including:
front and rear spaced elements, each having front and rear surfaces and being sealably bonded together in a spaced-apart relationship to define a chamber therebetween, a first layer of transparent conductive material disposed on said rear surface of said front element, a second layer of transparent conductive material disposed on said rear surface of said front element, an electrochromic reversibly variable transmittance medium contained in said chamber in contact with said first and second layers of transparent conductive material, a reflective coating disposed on said rear surface of said rear element, and a signal light area disposed within said reflective coating, said signal light area having regions containing reflective material and regions substantially devoid of reflective material; and a signal light mounted behind said signal light area of said electrochromic mirror for selectively projecting light through said electrochromic mirror, wherein said reflective material is effective to reflect light through said electrochromic medium and said front and rear elements when said light reaches said reflective material after passing through said front element, said electrochromic medium, and said rear element.

22. The rearview mirror assembly as defined in claim 21, wherein said region devoid of said reflective material allows viewing of said signal light.

23. The rearview mirror assembly as defined in claim 21, wherein said region containing reflective material comprises about 50–70 percent of said signal light area and said region devoid of reflective material comprises about 30–50 percent of said signal light area.

24. The rearview mirror assembly as defined in claim 21, wherein said region containing reflective material includes a plurality of lines of reflective material that are separated by lines substantially devoid of reflective material.

25. The rearview mirror assembly as defined in claim 24, wherein said lines of reflective material and lines devoid of reflective material are vertical.

26. The rearview mirror assembly as defined in claim 24, wherein said lines of reflective material have a width of approximately 0.010 inch and said lines devoid of reflective material have a width of approximately 0.006 inch.

27. A rearview mirror assembly for a vehicle comprising:

a mirror including a transparent substrate, a reflective coating formed on a surface of said substrate, and a partially transmissive/reflective area disposed within said reflective coating, said partially transmissive/reflective area having regions containing reflective material and regions substantially devoid of reflective material; and a light source mounted behind said partially transmissive/reflective area of said mirror for selectively projecting light through said mirror, wherein said reflective material is effective to reflect light through said substrate when said light reaches said reflective material after passing through said substrate.

28. The rearview mirror assembly as defined in claim 27, wherein said light source is a signal light.

29. The rearview mirror assembly as defined in claim 27, wherein said light source is an information display.

30. The rearview mirror assembly as defined in claim 27, wherein said light source is an indicator light.

31. The rearview mirror assembly as defined in claim 27, wherein said mirror further includes an electrochromic medium.

32. The rearview mirror assembly as defined in claim 27, wherein said region devoid of said reflective material allows viewing of said light source.

33. The rearview mirror assembly as defined in claim 27, wherein said region containing reflective material comprises about 50–70 percent of said area and said region devoid of reflective material comprises about 30–50 percent of said area.

34. The rearview mirror assembly as defined in claim 27, wherein said region containing reflective material includes a plurality of lines of reflective material that are separated by lines substantially devoid of reflective material.

35. The rearview mirror assembly as defined in claim 34, wherein said lines of reflective material and lines devoid of reflective material are vertical.

36. The rearview mirror assembly as defined in claim 34, wherein said lines of reflective material have a width of approximately 0.010 inch and said lines devoid of reflective material have a width of approximately 0.006 inch.

37. The rearview mirror assembly as defined in claim 27 and further including a housing in which said electrochromic mirror and said light source are mounted, said housing having a mounting member for mounting said housing to the exterior of a vehicle.

38. The rearview mirror assembly as defined in claim 27 and further including a housing in which said electrochromic mirror and said light source are mounted, said housing having a mounting member for mounting said housing to the interior of a vehicle.

39. A rearview mirror assembly for a vehicle comprising:

a housing for mounting to a vehicle;

a mirror mounted in said housing and including a transparent substrate, a reflective coating formed on a surface of said substrate, and a partially transmissive/reflective area disposed within said reflective coating, said partially transmissive/reflective area having regions containing reflective material and regions substantially devoid of reflective material; and a light source mounted in said housing behind said partially transmissive/reflective area of said mirror for selectively projecting light through said mirror, wherein said reflective material is effective to reflect light through said substrate when said light reaches said reflective material after passing through said substrate, and said regions devoid of said reflective material allow light from said light source to be transmitted through said mirror.

40. The rearview mirror assembly as defined in claim 39, wherein said light source is a signal light.

41. The rearview mirror assembly as defined in claim 39, wherein said regions containing reflective material include a plurality of lines of reflective material that are separated by lines substantially devoid of reflective material.

42. The rearview mirror assembly as defined in claim 39, wherein said regions containing reflective material include a plurality of circles of reflective material that are separated by said regions substantially devoid of reflective material.

43. The rearview mirror assembly as defined in claim 39, wherein said regions devoid of reflective material include a plurality of circular apertures formed in the reflective material.

44. The rearview mirror assembly as defined in claim 39, wherein said housing having a mounting member for mounting said housing to the exterior of a vehicle.

\* \* \* \* \*